US 8,006,313 B1

(12) United States Patent
Moulana et al.

(10) Patent No.: US 8,006,313 B1
(45) Date of Patent: Aug. 23, 2011

(54) NON-MACHINE SPECIFIC OPTICAL-MEDIA BASED COPY PROTECTION

(75) Inventors: Nausheen Moulana, Framingham, MA (US); Justin Marina, Framingham, MA (US); Gadi Reinhorn, Cambridge, MA (US)

(73) Assignee: The Math Works, Inc., Natick, MA (US)

( * ) Notice: Subject to any disclaimer, the term of this patent is extended or adjusted under 35 U.S.C. 154(b) by 983 days.

(21) Appl. No.: 10/763,484

(22) Filed: Jan. 23, 2004

(51) Int. Cl.
*G06F 7/04* (2006.01)

(52) U.S. Cl. ............................... 726/32; 726/33; 726/31

(58) Field of Classification Search .................. 726/26, 726/31–33; 713/193; 719/321, 322, 324, 719/326, 327
See application file for complete search history.

(56) References Cited

U.S. PATENT DOCUMENTS

| | | | | |
|---|---|---|---|---|
| 4,462,078 A * | 7/1984 | Ross | ............................... | 726/32 |
| 5,745,459 A * | 4/1998 | Inokuchi et al. | ............ | 369/53.21 |
| 5,896,454 A * | 4/1999 | Cookson et al. | ................ | 360/60 |
| 6,081,897 A * | 6/2000 | Bersson | ......................... | 726/32 |
| 6,314,518 B1 * | 11/2001 | Linnartz | ........................ | 713/176 |
| 6,480,959 B1 * | 11/2002 | Granger et al. | ................ | 713/189 |
| 7,039,848 B2 * | 5/2006 | Inokuchi et al. | ............. | 714/769 |
| 2002/0146121 A1 * | 10/2002 | Cohen | ......................... | 380/201 |
| 2003/0012375 A1 * | 1/2003 | Sako et al. | ...................... | 380/59 |
| 2003/0182574 A1 * | 9/2003 | Whitten et al. | ............... | 713/201 |
| 2003/0219124 A1 * | 11/2003 | Selinfreund et al. | .......... | 380/201 |
| 2004/0025024 A1 * | 2/2004 | Hirai | ............................. | 713/176 |
| 2004/0133523 A1 * | 7/2004 | Inokuchi et al. | ............... | 705/57 |
| 2005/0223240 A1 * | 10/2005 | Miles | ............................. | 713/193 |
| 2006/0259975 A1 * | 11/2006 | Cohen | ............................ | 726/26 |

\* cited by examiner

*Primary Examiner* — Edward Zee
(74) *Attorney, Agent, or Firm* — Nelson Mullins Riley & Scarborough LLP

(57) ABSTRACT

A method of preventing use of an illegally copied optical medium comprises the step of identifying the media type of the optical medium to determine whether the optical medium is an original version or an unauthorized copy. If the media type indicates that the optical medium is an original version, use of the optical medium is not prevented. If the media type indicates that the optical medium is an unauthorized copy, use of the optical medium is inhibited. The media type can be identified by reviewing a medium-type code field contained in a mode parameter header of the optical medium, which corresponds to the media type of the optical medium, and is a feature integrated into the media that cannot be copied.

22 Claims, 3 Drawing Sheets

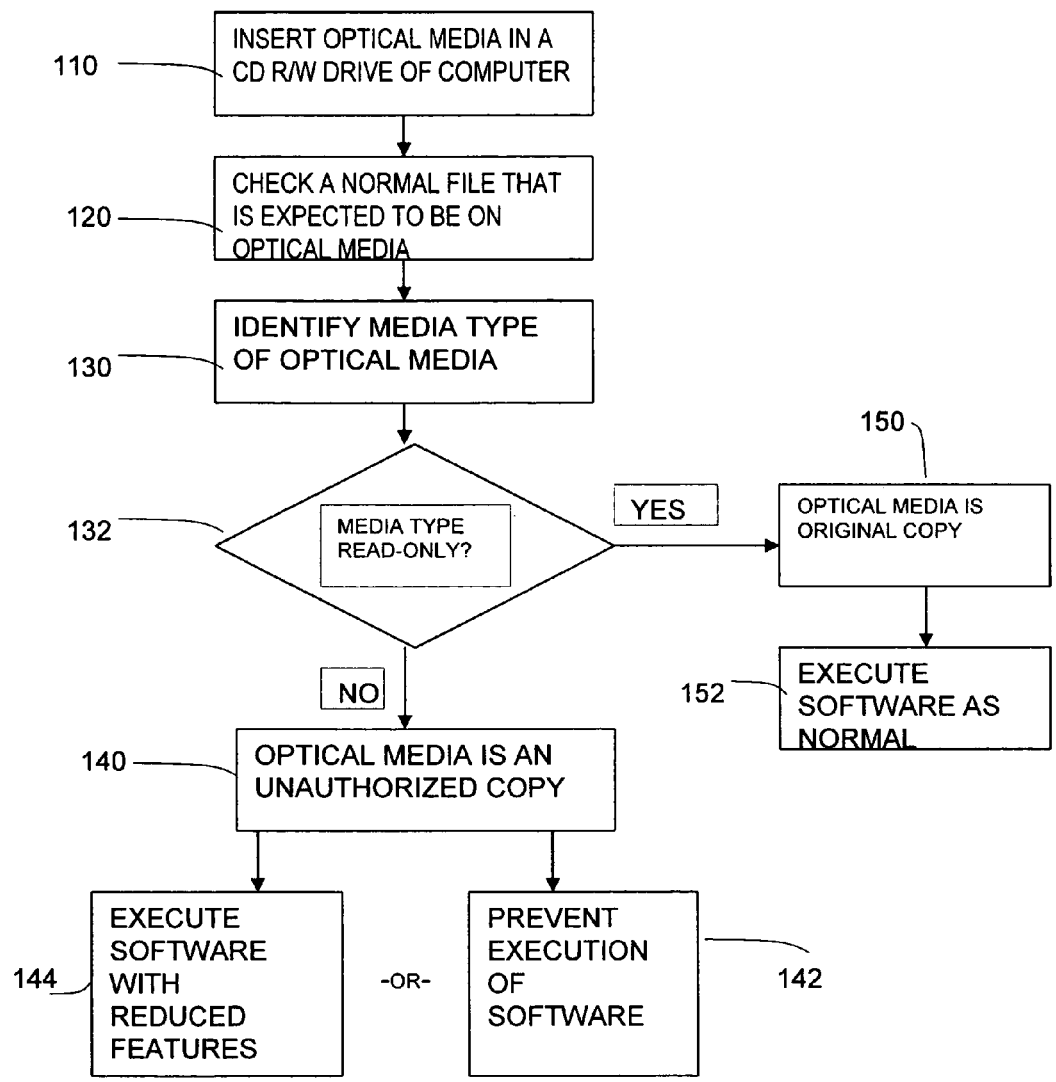

Table I
(SCSI – 2 Standard)

| Code | Description |
|---|---|
| 00h | Default (only one medium type supported) |
| 01h | Optical read-only medium |
| 02h | Optical write-once medium |
| 03h | Optical reversible or erasable medium |
| 04h | Combination of read-only and write-once medium |
| 05h | Combination of read-only and reversible or erasable medium |
| 06h | Combination of write-once and reversible or erasable medium |
| 07h - 7Fh | RESERVED |
| 80h - FFh | Vendor-specific |

FIGURE 3

(prior art)

NON-MACHINE SPECIFIC OPTICAL-MEDIA BASED COPY PROTECTION

FIELD OF THE INVENTION

The present invention relates to copy protection for software to prevent unauthorized copying of information stored on the software. More particularly, the present invention relates to copy protection for optical media to prevent unauthorized copying of the optical media.

BACKGROUND OF THE INVENTION

Optical data storage media ("optical media") are media in which data is stored in an optically readable manner. Optical data media are used to distribute, store and access software and large volumes of data. Data is stored on optical media by forming optical deformations or marks at discrete locations in one or more layers of the medium. Such deformations or marks cause changes in light reflectivity. To read the data on an optical medium, an optical medium player or reader is used. An optical medium player or reader conventionally shines a small spot of laser light, the "readout" spot, through the disc substrate onto the data layer containing such optical deformations or marks as the medium or laser head rotates.

Original optical media, such as compact discs (CDs), are produced by stamping plastic blanks with a master mold piece, which is produced using costly, specialized equipment. Because of the high cost of optical media recording equipment, optical media recordings were considered, until recently, to be relatively secure against unauthorized copying. This situation has changed recently, as inexpensive optical media recording devices and read/write media have become available to consumers. A pirate can easily make unauthorized copies of optical media using a conventional personal computer with a read/write optical media drive, or with one read drive and one write drive, to make exact, digital copies of all types of optical media. The pirate extracts data byte-by-byte from one optical media, typically a legitimately-purchased original optical media, using a computer, and then writes the data to a blank writable or recordable optical media so as to make a pirate copy. As consumer demand for optical media remains high, and because such medium is easily reproduced at a low cost, counterfeiting has become prevalent. Resulting financial losses to the recording and software industries due to such pirate copying are estimated to be in the billions of dollars.

Many copy protection techniques and devices have been proposed in the art to limit the unauthorized copying of optical media. Currently, two general types of copy protection are used to protect against illegal copying of optical media, such as CD-ROMs (CD-read-only memory). The first type of copy protection includes software based, active methods of copy protection, which use 'bad' data written in a subchannel on the optical media to inhibit copying. Safedisc® is an example of a commercially available software program for CD authentication available from Macrovision Corporation of Santa Clara, Calif. The software does not work if it cannot find the expected bad data on the optical media, which indicates that the optical media is an original version. The 'bad' data is hard to copy, as only a few programs are capable of copying it, notably CLONECD and BLINDWRITE suite, which are available for download but not in stores.

The second type of copy protection currently in use includes passive methods of copy protection that writes sections of 'bad' data to the optical media to cause all of the data on the optical media to be uncopiable for many programs and devices, without an active step of checking for the 'bad' data. The bad sectors on the optical media, or the fact that more data was written to the optical media than it can physically hold according to the agreed-upon standard, causes the data to be uncopiable. Writing data in nonstandard formats to the optical media can cause the optical media to be rejected on certain drives. For example, certain drives have strict implementations of the CD-ROM standards (red book-audio CD, orange book-CD-R/W, yellow book-CD-ROM ISO9660, etc), and reject media (CDs) that do not strictly conform to the standard that is applicable to the data that it contains.

The prior methods of copy protection have several drawbacks. For example, the software based methods are available only on windows, as they are built on top of the Advanced SCSI (Small Computer Systems Interface) Programming Interface (ASPI) layer which provides a single interface into the many types of underlying optical media drives. UNIX/Linux does not have an ASPI layer equivalent. Therefore, copy protection software written for UNIX/Linux platforms requires separate functions for each and every optical media drive manufacturer and even model, making the copy protection software much harder to write and maintain. In addition, the software-based copy protection methods can be defeated by 'unwrapping' the executable so that it no longer checks for the bad sectors, as is the case for Safedisc, or by editing the binary executable, which is a non-trivial task. Once this is done, the program can be copied normally and the bad data is no longer needed. These methods can also be defeated simply by copying the CD-ROM onto a CD-R or CD-RW disc using software such as BLINDWRITE suite or CLONECD.

SUMMARY OF THE INVENTION

The present invention provides a simple, yet reliable and effective system and method of copy protection, which prevents use of unauthorized copies of optical media. The copy protection system is implemented on an optical medium to prevent use of the optical medium if it is an illicit copy. An illicitly copied optical medium is identified by reviewing the media type of the optical medium. Since the majority of originals are stamped in a factory on read-only medium, generally, a writable or rewritable type of optical medium, rather than a read-only type, indicates that the optical medium is a pirated copy that has been burned on a consumer optical media writer drive, rather than stamped. If a copied optical medium is identified, i.e., the media is writable or rewritable, execution of a software program on the optical medium is inhibited. The software program can either be executed with limited active features, or prevented from execution altogether when an illicitly copied medium is identified.

According to one aspect of the invention, a method of preventing use of an unauthorized copy of a software program is provided, as well as a medium containing instructions for the method. The method comprises the steps of determining the media type of an optical medium containing the software program and inhibiting execution of the software program stored on the optical medium if the optical media has media type that indicates that the optical media is copied.

According to another aspect of the invention, a method of authenticating an original optical medium is provided, as well as a medium containing instructions for the method. The method comprises the steps of inserting the optical medium in a CD-R/W drive of a computer and checking a media type of the optical medium.

According to another aspect of the invention, a method of preventing use of an unauthorized copy of a software program is provided, as well as a medium containing instructions for the method. The method comprises the steps of determining the media type of the optical medium and executing the software program stored on the optical medium if the optical medium has a media type that indicates that the optical medium is an original version.

According to still another aspect of the invention, an electronic device comprising memory, a processor and a CD-R/W drive is provided. The memory stores computer program instructions for determining the media type of an optical medium in the CD-R/W drive and inhibiting execution of the software program stored on the optical medium if the optical medium has media type that indicates that the optical medium is copied.

BRIEF DESCRIPTION OF THE FIGURE

FIG. 2 is a flow chart illustrating the steps involved in preventing use of an illicitly copied optical media according to an illustrative embodiment of the invention.

FIG. 3 is a table showing the relationship between a media-type code in a mode parameter header of an optical medium and the media type of the optical medium.

DETAILED DESCRIPTION OF ILLUSTRATIVE EMBODIMENTS

Figure 1:
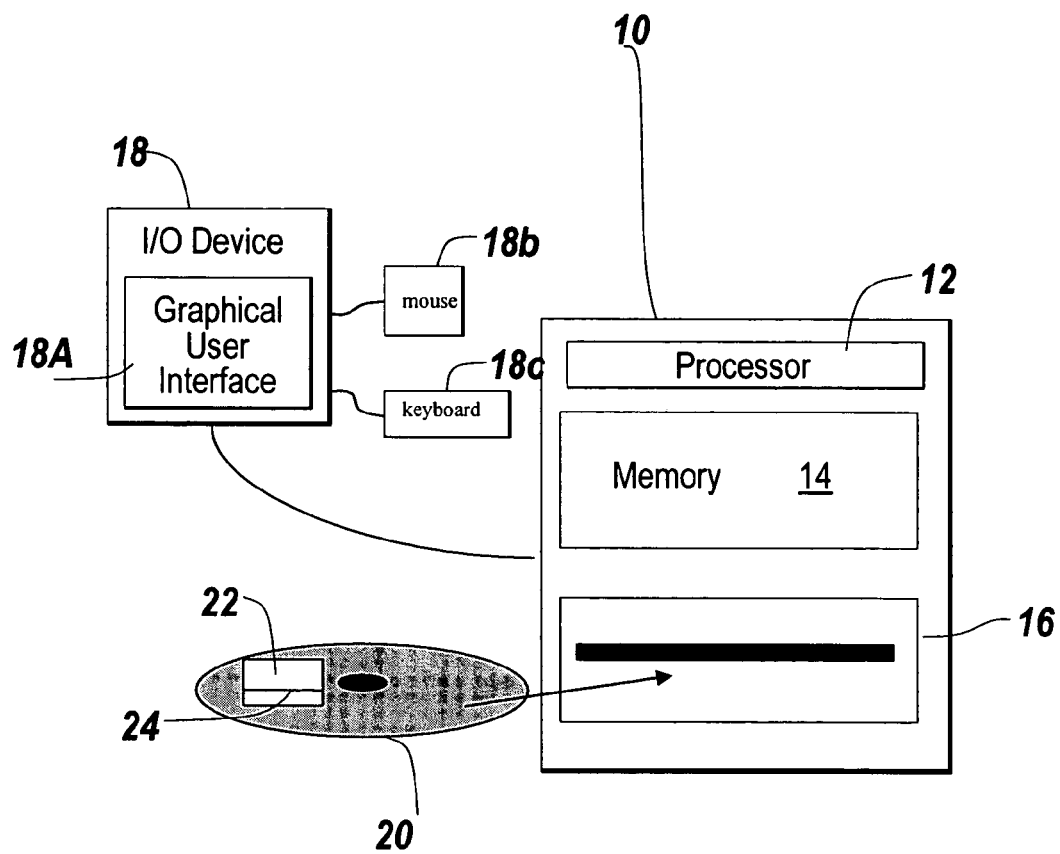
FIG. 1 illustrates a device that contains hardware and software for detecting whether an optical medium contains an illicit copy.

In an illustrative embodiment, the present invention provides a system and method for preventing unauthorized use of optical media. The present invention will be described below relative to an illustrative embodiment with respect to compact discs, though the invention may be implemented in any suitable optical media. Those skilled in the art will appreciate that the present invention may be implemented in a number of different applications and embodiments and is not specifically limited in its application to the particular embodiments depicted herein.

As used herein, the terms "optical medium" and "optical media" refer to a media of any geometric shape (not necessarily circular) that is capable of storing digital data that may be read by an optical reader. There are several different types of optical media, and each media type stores data using a different format. For example, in conventional "read-only" type optical media, digital data is generally stored in a series of pits embossed with a plane of lands. Data is conventionally stamped onto read-only media by an injection molding process during the manufacture of the read-only medium. Microscopic pits formed in the surface of the plastic medium are arranged in information tracks, conventionally spaced radially from the center hub in a spiral track originating at the medium center hub and ending toward the medium's outer rim. The pitted side of the medium is coated with a reflectance layer such as a thin layer of aluminum or gold. A lacquer layer is typically coated thereon as a protective layer. Examples of read-only optical media include CD-DA (digital audio compact disc), CD-ROM (CD-read-only memory) and DVD (digital versatile disc or digital video disc) media.

A number of types of optical media are available which permit an end-user to record data on the media, rather than a manufacturer. Such optical media generally are categorized as "writable" or "recordable," or "re-writable." In contrast to read-only media, data is conventionally written onto prefabricated writeable and rewritable medium individually, for example, one disc at a time, using a laser. As a result, bits written by the manufacturer through the stamping process are different from bits written during a duplication process through burning the optical medium surface.

"Writable" optical media, also known as "recordable", or "write-once read-many times" (WORM) media, permit an end-user to write data permanently to the medium. Data can be recorded once on the writable optical media, but cannot be erased from the optical media. Examples of writeable or recordable formats include CD-R (CD-recordable) and DVD-R (DVD-recordable) medias. Writable media are designed such that laser light in the writer apparatus causes permanent deformations or changes in the optical reflectivity of discrete areas of the data layer(s) of the medium.

"Rewritable" optical media use the laser beam to cause reversible optical deformations or marks in the data layer(s), such that the data layer is capable of being written on, read, erased and rewritten on many times. Several rewritable optical media systems are known, including CD-RW (CD-rewriteable), DVD-RAM (DVD-Random Access Media), DVD-RW or DVD+RW (DVD-rewriteable), PD (Phase change Dual disk by Panasonic) and other phase change optical discs. Erasable, or rewritable, optical discs function in a similar manner to magneto-optical (MO) disks and can be rewritten repeatedly.

An optical medium player or reader reads data from an optical disc medium, such as a CD, by moving a read head generating a light beam in a specified path relative to the spinning optical medium. The light beam is used to differentiate regions having different optical properties, where the different optical properties represent the data. For example, the "on" logical state is represented by a particular region having a particular optical property, while the "off" logical state is represented by another region having a different optical property. The detectable differences in the different regions are converted into electrical signals, which are then converted to a format that can be conveniently manipulated by a signal processing system.

For example, the intensity of the light reflected from a read-only medium's surface by an optical medium player or reader varies as the signal transitions between pits and lands along the information track, where pits represent a 1 and lands represent a 0. When the readout spot is over a land part of the track, more light is reflected directly from the disc than when the readout spot is over a pit. A photodetector and other electronics inside the optical medium player translate the signal from the transition points between these pits and lands caused by this variation into the 0s and 1s of the digital code representing the stored information. In this manner, binary information may be read from the medium.

The vast majority of commercially available software, video, audio, and entertainment pieces available today are recorded on read-only types of optical media. For example, an original format of a compact disc is generally a CD-ROM, which is a read-only optical media (yellow book standard) that is stamped in a factory, not burned. In contrast, a copied CD will generally be burned on a CD-R or CD-RW disc, which is write-once, or eraseable/rewriteable optical media (orange book standard).

The copy protection system and method of an illustrative embodiment of the invention is software based, and built on the ASPI layer, which facilitates implementation of the copy protection method on a windows platform. Unlike the other copy protection methods of the prior art, the illustrative copy protection method is added to the optical media without altering the optical media itself. As a result, there is no risk for incompatibility of the optical media with any drive or platform. The illustrative copy protection system and method may be implemented in a single-use or multi-use product to prevent unauthorized use of an illicitly copied software program stored on the product.

FIG. 1 illustrates an environment suitable for implementing the copy protection method according to an illustrative embodiment of the invention. An electronic device 10 includes memory and a processor 12 coupled bi-directionally to the memory 14 for executing software stored in the memory and other programs for controlling hardware. Prior to running any application program, the machine language code comprising the program is loaded into RAM within memory 14 and then executed by processor 12. An input/output device 18, which include a display device 18a, such as a screen displaying a graphical user interface, interfaces with the electronic device 10 to enable user interaction with the electronic device 10. The illustrative system also includes other suitable conventional I/O peripherals, such as a mouse 18b and keyboard 18c.

An optical medium 20 storing programs and data can be inserted in a drive of the electronic device, illustrated as a compact disk-read/write memory (CD-R/W) drive 16 to access the programs and data stored thereon. The optical medium contains a software program 22, and the manufacturer seeks to prevent a user from using illicit copies of the software program using a copy protection program 24. In the illustrative embodiment, the copy protection program 24 is stored with the software program 22 on the optical medium 20, so that a copy of the software program will also contain a copy of the copy protection program. Alternatively, the copy protection program 24 may be stored in the memory 14 or integrated in the operating system or hardware of an electronic device to prevent the electronic device from executing a software program 22 that the copy protection program identifies as an illicit copy.

FIG. 2 is a flow chart illustrating the steps invoked by a copy protection program to prevent use of an unauthorized copy of a compact disc or other optical media containing a software program that a manufacturer does not wish to be copied by end-users. The illustrative copy protection program identifies a copied optical medium by examining a feature integrated in the physical media of the optical medium itself. The illustrative embodiment is described relative to a CD-ROM optical medium storing a software program, of which the manufacturer seeks to prevent unauthorized copies, though the copy protection system and method is applicable to any suitable type of optical media.

In step 110, the user inserts an optical medium, such as a CD-ROM, containing a software program to be executed into a drive of a machine, such as a computer, presumably in anticipation of running the software program. In the illustrative embodiment, the optical medium is inserted into a CD-R/W drive. One skilled in the art will recognize that the illustrative method may be implemented on any suitable optical media drive of a computer that is capable of checking the media type of an optical medium inserted therein. In step 120, the copy protection program, which is also stored on the optical medium, checks a normal file that is expected to be on the optical medium, for example, a file containing the software program, to make sure that the desired optical medium is in the drive.

Prior to executing the software program, the copy protection program authenticates the optical medium to ensure that the optical medium is an original, rather than unauthorized, copy. In step 130, the copy protection program identifies the media type of the optical medium. By checking the media type of the optical medium, the copy protection program can identify whether the optical medium is an original medium, or a burned medium (i.e., an unauthorized copy). For example, an original medium will generally be a read-only medium that has been stamped in a factory during the manufacture of the optical medium. An unauthorized copy will generally be written by a laser ("burned") onto a writable or a rewritable type optical medium. Because the bits written by a manufacturer through the stamping process are different from the bits written by a pirate through a burning process, e.g. orange book standard compliant CD-R/W media (consumer burned CD) vs. yellow book CD-ROM (manufactured CD), the optical medium can identify an unauthorized copy.

The media-type of an optical medium can be identified by examining a mode parameter header in the optical medium, which contains the media-type code field, using the operating system calls of the user's machine to retrieve the relevant information from the optical medium. The medium-type code values used for optical memory devices are defined by industry standards. For example, Section 16.3.3 of the SCSI-2 standard shows the codes representing the CD media type used by CD-R/W drives and CD-writing software to determine what type of a CD is in the drive before performing burning operations to write to the CD. In FIG. 3, Table I lists the optical memory media-type codes for different media-types.

After identifying the media type in step 130, the copy protection program of the illustrative embodiment determines whether the optical medium has a media type that is indicative of an original version. For example, in the illustrative embodiment, a read-only media type is indicative that the optical medium is an original. Therefore, in step 132, the copy protection program determines whether the optical medium is a read-only optical medium. For example, if the optical medium contains a code of 01h in the mode parameter header, which represents that the optical medium under review is a read-only media, as indicated in FIG. 3, the copy protection program classifies the optical medium as a legitimate original version in step 150. In step 152, the software program is run as usual.

In contrast, if optical medium has a media type that is indicative of an unauthorized copy, the copy protection program determines the optical medium to be an unauthorized copy, rather than a legitimately-purchased original optical medium, which was stamped by the original manufacturer during the manufacturing process. In the illustrative embodiment, if the media type of the optical medium is not read-only, the copy protection program classifies the optical medium as an unauthorized copy in step 140. For example, if the optical medium contains one of the codes associated with a recordable or writable medium, for example 02h, 03h, 04h, 05h or 06h, in the mode parameter header, as shown in the Table of FIG. 3, the optical medium is determined to be an unauthorized copy.

If the optical medium is determined to be an unauthorized copy in step 140, the copy protection program inhibits execution of the software program that the user anticipates running. The copy protection program inhibits execution of the software program by either preventing the software program stored on the optical medium from running in step 142, or, in step 144, running the software program with fewer features active, which renders the unauthorized copy essentially useless to the user.

The copy protection method of the illustrative embodiment of the invention depends on a feature integrated in the physical media of the optical medium to identify a copied optical medium, and thus gives the software the option of not running, or running with fewer features active. Since the copy protection system method depends on the media type of the optical medium, it cannot be defeated by copying the optical medium, since no matter how good a copy of the software is, an optical medium that has been burned will be consistently identified as a copied optical medium based on the media type.

The copy protection method can only be defeated through a few methods, such as binary editing of the executable to bypass the check. However, binary editing is a non-trivial task, which can be applied to any software whatsoever to defeat its protection. Alternatively, the copy protection method can be defeated by running the software on a drive that does not have the capability to check the media type of an optical medium stored therein. For example, a copied CD in a CD-ROM drive instead of a CD-R/W drive will not check the media type of the CD to determine whether the CD is a CD-ROM, or another type of CD. However, most computers shipping today have built-in CD-R/W drives. The only other method for defeating the copy protection method involves buying a stamping machine, such as a CD-ROM stamping machine, and making copies of an original optical medium on a read-only type of optical medium. However, buying a stamping machine is a cost-prohibitive action, which would defeat the purpose of copying optical medium for most users.

The present invention has been described relative to an illustrative embodiment. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

The invention claimed is:

1. A method of preventing use of an unauthorized copy of a software program residing on an optical medium, the method comprising:
    providing a protection program built on the Advanced SCSI Programming Interface (ASPI) layer, the protection program residing on the optical medium with the software program;
    searching, using the protection program residing on the optical medium, for a file on the optical medium prior to determining a media type of the optical medium, the file containing the software program;
    determining, using the protection program residing on the optical medium, the media type of the optical medium containing the software program by examining a mode parameter header of the optical medium once the file has been located, the mode parameter header containing a media type code field; and
    inhibiting, using the protection program residing on the optical medium, execution of the software program stored on the optical medium if:
        the file is missing on the optical medium, or
        the optical medium has a media type that indicates that the optical medium is copied.

2. The method of claim 1, wherein inhibiting the execution of the software program comprises preventing execution of selected features of the software program.

3. The method of claim 2, wherein inhibiting the execution of the software program comprises determining a set of features of the software program to execute.

4. The method of claim 1, wherein inhibiting the execution of the software program comprises preventing execution of the software program.

5. The method of claim 1, wherein determining a media type comprises accessing the optical medium in a drive of a computer and reviewing a medium-type code field contained in a mode parameter header of the optical medium.

6. The method of claim 5, wherein the drive is a compact disk-read/write (CD-R/W) drive.

7. The method of claim 1, wherein a media type indicates that the optical medium is copied is one of a write-once media type and an erasable/rewriteable media type.

8. The method of claim 1, further comprising executing the software program stored on the optical medium if determining determines the optical medium to be an optical read-only medium.

9. A method of authenticating an original optical medium, the method comprising:
    accessing the optical medium in a compact disk-read/write (CD-R/W) drive coupled to a computer; and
    identifying a protection program built on the Advanced SCSI Programming Interface (ASPI) layer, the protection program residing on the optical medium;
    searching, using the protection program residing on the optical medium, for a file on the optical medium prior to checking a media type of the optical medium, the file containing a software program to be authenticated; and
    checking, using the protection program residing on the optical medium, the media type of the optical medium by examining a mode parameter header of the optical medium once the file has been located, the mode parameter header containing a media type code field.

10. The method of claim 9, wherein checking a media type comprises reviewing a medium-type code field contained in a mode parameter header of the optical medium.

11. The method of claim 9, wherein checking the media type comprises verifying that the optical medium has a read-only media type.

12. The method of claim 11, wherein a read-only media type is indicative that the optical medium is an original version.

13. The method of claim 11, further comprising executing a software program stored on the optical medium if the optical medium has a read-only media type.

14. The method of claim 9, wherein checking the media type comprises identifying if the media type is one of a write-once media type and an erasable/rewriteable media type.

15. The method of claim 14, further comprising inhibiting execution of a software program stored on the optical medium if checking identifies that the media type is one of a write-once media type and an erasable/rewriteable optical media type.

16. A method of preventing execution of an unauthorized copy of a software program stored on an optical medium, the method comprising:
    identifying a protection program built on the Advanced SCSI Programming Interface (ASPI) layer, the protection program residing on the optical medium with the software program;
    searching, using the protection program residing on the optical medium, for a file on the optical medium prior to determining a media type of the optical medium, the file containing the software program;
    determining, using the protection program residing on the optical medium, the media type of the optical medium by examining a mode parameter header of the optical medium once the file has been located, the mode parameter header containing a media type code field; and executing the software program stored on the optical medium if:
    the file is included on the optical medium, and
    the optical medium has a media type that indicates that the optical medium is an original version.

17. The method of claim 16, wherein a read-only media type indicates that the optical medium is an original version.

18. The method of claim 16, further comprising inhibiting execution of the software program if the optical medium does not have a read-only media type.

19. A computer-readable optical medium containing instructions for preventing use of an unauthorized copy of a software program stored on the optical medium when the instructions are executed on a processing device, the optical medium storing:
    instructions for the software program; and
    instructions for a protection program built on the Advanced SCSI Programming Interface (ASPI) layer that prevents the unauthorized copy of the software program from being used when the instructions for the protection program are executed on the processing device, the instructions for the protection program comprising instructions for:
        searching, using the protection program residing on the optical medium, for a file on the optical medium prior to determining a media type of the optical medium, the file containing the software program;
        determining, using the protection program residing on the optical medium, the media type of the optical medium containing the software program by examining a mode parameter header of the optical medium once the file has been located, the mode parameter header containing a media type code field; and
        inhibiting, using the protection program residing on the optical medium, execution of the software program stored on the optical medium if:
            the file is missing on the optical medium, or
            the optical medium has a media type that indicates that the optical medium is copied.

20. A computer-readable optical medium containing instructions for interacting with the optical medium when the instructions are executed on a processing device, the optical medium storing:
    instructions for a software program; and
    instructions for a protection program built on the Advanced SCSI Programming Interface (ASPI) layer that prevents use of an unauthorized copy of the software program, the instructions for the protection program comprising instructions for:
        detecting the optical medium in a compact disk-read/write (CD-R/W) drive of a computer;
        searching, using the protection program residing on the optical medium, for a file on the optical medium prior to checking a media type of the optical medium, the file containing the software program; and
        checking, using the protection program residing on the optical medium, the media type of the optical medium by examining a mode parameter header of the optical medium once the file has been located, the mode parameter header containing a media type code field.

21. A computer-readable optical medium containing instructions for preventing execution of an unauthorized copy of a software program stored on the optical medium when the instructions are executed on a processing device, the optical medium storing:
    instructions for the software program; and
    instructions for a protection program built on the Advanced SCSI Programming Interface (ASPI) layer that prevents the unauthorized copy of the software program from being executed when the instructions for the protection program are executed on the processing device;
    searching, using the protection program residing on the optical medium, for a file on the optical medium prior to determining a media type of the optical medium, the file containing the software program;
    determining, using the protection program residing on the optical medium, the media type of the optical medium by examining a mode parameter header of the optical medium once the file has been located, the mode parameter header containing a media type code field; and
    executing the software program stored on the optical medium if:
        the file is included on the optical medium, and
        the optical medium has a media type that indicates that the optical medium is an original version.

22. A system comprising:
    an electronic device including:
        a memory for storing computer program instructions,
        a processor for executing the stored computer program instructions, and
        a compact disk-read/write (CD-R/W) drive; and
    an optical medium provided in the CD-R/W drive, the optical medium containing a software program and a protection program built on the Advanced SCSI Programming Interface (ASPI) layer, the protection program including instructions for:
        searching, from the optical medium, for a file on the optical medium prior to determining a media type of the optical medium, the file containing the software program,
        determining the media type of the optical medium by examining a mode parameter header of the optical medium once the file has been located, the mode parameter header containing a media type code field and
        inhibiting execution of the software program stored on the optical medium if the file is missing on the optical medium or the optical medium has a media type that indicates that the optical medium is copied.

* * * * *

UNITED STATES PATENT AND TRADEMARK OFFICE
CERTIFICATE OF CORRECTION

| | | |
|---|---|---|
| PATENT NO. | : 8,006,313 B1 | Page 1 of 1 |
| APPLICATION NO. | : 10/763484 | |
| DATED | : August 23, 2011 | |
| INVENTOR(S) | : Nausheen Moulana et al. | |

It is certified that error appears in the above-identified patent and that said Letters Patent is hereby corrected as shown below:

On the Title Page, at Item (73) Assignee, replace "The Math Works, Inc." with --The MathWorks, Inc.--.

Signed and Sealed this
Eighteenth Day of November, 2014

Michelle K. Lee
*Deputy Director of the United States Patent and Trademark Office*